United States Patent
He et al.

(10) Patent No.: US 8,797,722 B2
(45) Date of Patent: Aug. 5, 2014

(54) NON-FLAT PANEL DISPLAY MODULE AND BACK FRAME SUPPORT STRUCTURE THEREOF

(75) Inventors: Chengming He, Shenzhen (CN); Guofu Tang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 332 days.

(21) Appl. No.: 12/991,486

(22) PCT Filed: Aug. 18, 2010

(86) PCT No.: PCT/CN2010/076089
§ 371 (c)(1),
(2), (4) Date: Nov. 8, 2010

(87) PCT Pub. No.: WO2012/006799
PCT Pub. Date: Jan. 19, 2012

(65) Prior Publication Data
US 2012/0281367 A1  Nov. 8, 2012

(30) Foreign Application Priority Data

Jul. 12, 2010 (CN) .......................... 2010 1 0225739

(51) Int. Cl.
*H05K 5/00* (2006.01)

(52) U.S. Cl.
USPC .................. 361/679.01; 248/27.1; 248/124.1; 248/159; 248/188.91; 248/917; 248/918; 361/679.21; 361/679.22

(58) Field of Classification Search
CPC .............. G02F 1/133308; G02F 2001/133322; G02F 2001/133314; G02F 2201/56; G02F 2001/133317; G02F 1/133608; G02F 2201/46; H02G 3/32
USPC ........... 349/58; 359/291; 361/679.01, 679.02, 361/679.21–679.22; 248/27.1, 65, 124.1, 248/159, 188.91, 214, 354.6, 917–918; 345/1.1, 108
See application file for complete search history.

(56) References Cited

U.S. PATENT DOCUMENTS

| | | | |
|---|---|---|---|
| 7,922,132 B2 * | 4/2011 | Saez et al. .................. | 248/124.1 |
| 2009/0091681 A1 * | 4/2009 | Nishizawa et al. ............. | 349/58 |
| 2010/0220257 A1 * | 9/2010 | Sakamoto et al. ............. | 349/58 |

FOREIGN PATENT DOCUMENTS

| | | |
|---|---|---|
| CN | 101344651 A | 1/2009 |
| CN | 101661692 A | 3/2010 |
| JP | 2010066706 A | 3/2010 |

* cited by examiner

*Primary Examiner* — Robert J Hoffberg
*Assistant Examiner* — Hung Dang
(74) *Attorney, Agent, or Firm* — Cheng-Ju Chiang

(57) ABSTRACT

Disclosed are a non-flat panel display module and the back frame support structure thereof. The non-flat panel display module comprises a non-flat display panel and an outer frame. The outer frame comprises a back frame. The back frame has a non-flat shape in accordance with a back surface of the non-flat display panel and is fixed to the back surface of the non-flat display panel. At least one support structure is fixed to the outer surface of the back frame. The support structure is fixed to an outer surface of the back frame. Therefore, the support structure can strengthen the outer frame intensity and to ensure the intensity and the curved feature of the non-flat panel display module.

9 Claims, 3 Drawing Sheets

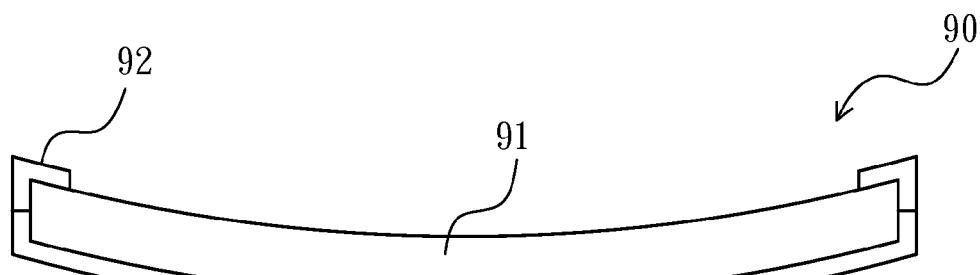
FIG. 1A (Prior Art)
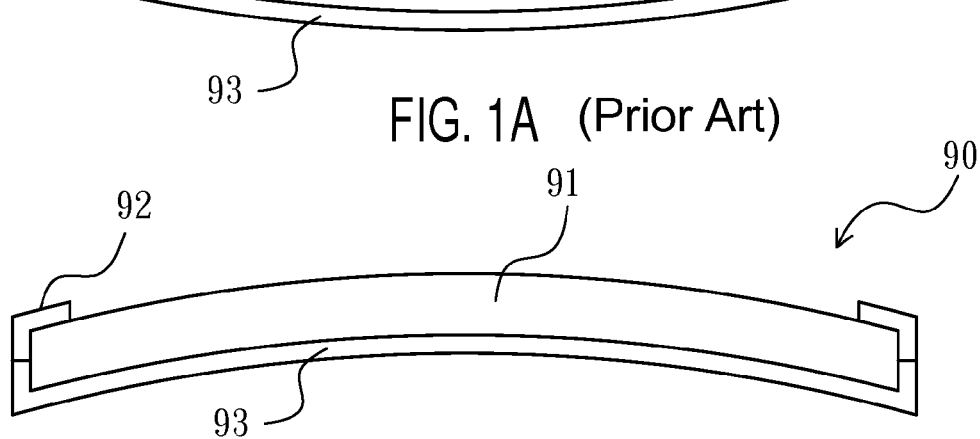
FIG. 1B (Prior Art)
FIG. 1C (Prior Art)
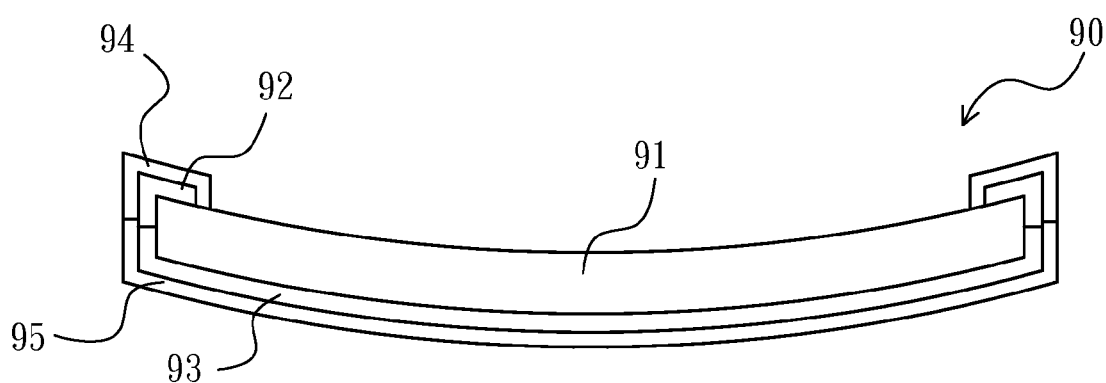
FIG. 2 (Prior Art)

NON-FLAT PANEL DISPLAY MODULE AND BACK FRAME SUPPORT STRUCTURE THEREOF

BACKGROUND OF THE INVENTION

1. Field of the Invention

The present invention generally relates to a non-flat panel display module and the back frame support structure thereof, and more particularly to a non-flat panel display module and the back frame support structure thereof capable of ensuring the outer frame intensity and the curved feature.

2. Description of Prior Art

Most LCD panels are designed as flat but still one kind of non-flat panel display exists. Please refer to FIG. 1A. FIG. 1A shows a top view diagram of one non-flat display panel according to prior art. The non-flat display panel 90 comprises a non-flat panel display module 91, a front frame 92 and a back frame 93. The non-flat panel display module 91 is a concave like display module, i.e. a middle indent shape appearance display module. The front frame 92 and the back frame 93 fix and cover the non-flat panel display module 91 together and the front frame 93 reveals a display area of the non-flat panel display module 91.

Please refer to FIG. 1B. FIG. 1B shows a top view diagram of a second non-flat display panel according to prior art. The non-flat display panel 90 comprises a non-flat panel display module 91, a front frame 92 and a back frame 93. The non-flat panel display module 91 is a convex like display module, i.e. a middle raised shape appearance display module. The front frame 92 and the back frame 93 fix and cover the non-flat panel display module 91 together and the front frame 93 reveals a display area of the non-flat panel display module 91.

Please refer to FIG. 1C. FIG. 1C shows a top view diagram of a third non-flat display panel according to prior art. The non-flat display panel 90 comprises a non-flat panel display module 91, a front frame 92 and a back frame 93. The non-flat panel display module 91 is a bended flat display module, i.e. a multiple sections panel (not parallel) display module with contained angles between the panels. As shown in FIG. 1C, The bended non-flat panel display module 91 is composed by three flat display panel units connected with one by one. The panels at two sides are set forward to create a concave like visual effect.

Please refer to FIG. 2, which shows a top view assembly diagram of the non-flat display panel 90 according to prior art shown in FIG. 1A. The non-flat display panel 90 comprises a fore-shield 94 and a back-shield 95. The fore-shield 94 and the back-shield 95 fix and cover the front frame 92 and the back frame 93 of the non-flat display panel 90 and the front frame 92 together to protect the non-flat display panel 90 and prettify the appearance thereof.

In conclusion, the non-flat display panel 90 can create a visual effect different from the traditional LCD panel with the concave like or the convex like characteristic and specifically fits for the needs of large size display panels. However, the back frame 93 of the non-flat display panel 90 is manufactured by plastic or metal materials in general. The intensity of the plastic back frame is less and the plastic back frame is easily deformable. The metal back frame generates a recovery tension. Therefore, the curved feature of the non-flat display panel 90 cannot be ensured for remaining a long time. A quality defect consequently cannot be avoided.

Consequently, there is a need to provide a non-flat panel display module and the back frame support structure thereof to solve the existing drawbacks of prior arts.

SUMMARY OF THE INVENTION

An objective of the present invention is to provide a non-flat panel display module and the back frame support structure thereof. With at least one support structure fixed to the outer surface of the back frame of the non-flat panel display module, the outer frame intensity of the non-flat panel display module can be strengthened to ensure the intensity and the curved feature of the non-flat panel display module.

Another objective of the present invention is to provide a back frame support structure with at least one reinforcing rib set on the outer surface of the support structure to strengthen the support structure intensity and the outer frame intensity of the non-flat panel display module further. Accordingly, the intensity and the curved feature of the non-flat panel display module can be double ensured.

For realizing the aforesaid objective, the back frame support structure of the non-flat panel display module provided by the present invention comprises at least one support structure. The support structure is fixed to an outer surface of the back frame. The support structure is in accordance with the non-flat shape of the outer surface of the back frame.

In one embodiment of the present invention, the support structure further comprises a plurality of fixing holes to be fixed to a plurality of screw holes correspondingly positioned on the outer surface of the back frame by a plurality of screwed elements.

In one embodiment of the present invention, the support structure has a thickness and can be solid or hollow.

In one embodiment of the present invention, the support structure further comprises at least one reinforcing rib set on an outer surface of the support structure.

In one embodiment of the present invention, the support structure is a rigid material support structure.

For realizing the aforesaid another objective, the non-flat panel display module provided by the present invention comprises a non-flat display panel and an outer frame. The outer frame comprises a back frame. The back frame is in accordance with a non-flat shape of a back surface of the non-flat display panel and fixed to the back surface of the non-flat display panel in back. At least one support structure is fixed to the outer surface of the back frame. The support structure is in accordance with the non-flat shape of the outer surface of the back frame. The support structure is utilized to strengthen the outer frame intensity and to ensure the intensity and the curved feature of the non-flat panel display module.

In one embodiment of the present invention, the non-flat display panel is a curved display panel or a multiple sections bended display panel.

In one embodiment of the present invention, the outer frame further comprises a front frame. The front frame and the back frame fix and cover the non-flat display panel with the back frame together. The front frame reveals a display area of the non-flat display panel.

In one embodiment of the present invention, the support structure further comprises a plurality of fixing holes to be fixed to a plurality of screw holes correspondingly positioned on the outer surface of the back frame by a plurality of screwed elements.

In one embodiment of the present invention, the amount of the support structures is two or more, which are parallelly aligned one with another.

BRIEF DESCRIPTION OF THE DRAWINGS

FIG. 1A shows a top view diagram of one non-flat display panel according to prior art.

FIG. 1B shows a top view diagram of another non-flat display panel according to prior art.

FIG. 1C shows a top view diagram of the other non-flat display panel according to prior art.

FIG. 2 shows a top view assembly diagram of the non-flat display panel according to prior art shown in FIG. 1A.

DETAILED DESCRIPTION OF THE INVENTION

Figure 3:
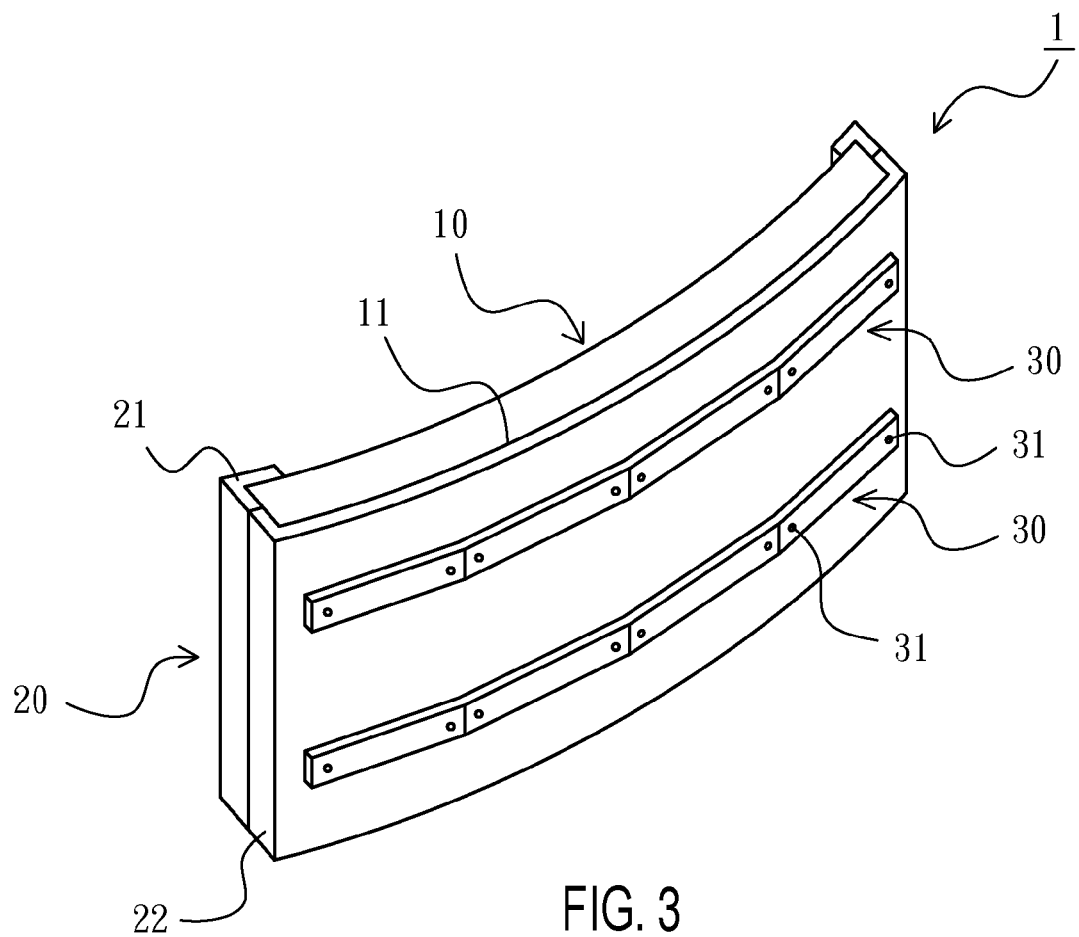
FIG. 3 shows a three dimensional view assembly diagram of a non-flat panel display module according to the first embodiment of the present invention.

For a better understanding the aforementioned content of the present invention, preferable embodiments are illustrated in accordance with the attached figures for further explanation:

Please refer to FIG. 3, which shows a three dimensional view assembly diagram of a non-flat panel display module according to the first embodiment of the present invention. The non-flat panel display module 1 comprises a non-flat display panel 10 and an outer frame 20. The non-flat display panel 10 is a curved display panel. The outer frame 20 comprises a back frame 22. The back frame 22 has a non-flat shape in accordance with a back surface 11 of the non-flat display panel 10 and is fixed to the back surface 11 of the non-flat display panel 10. Moreover, the outer frame 20 further comprises a front frame 21. The front frame 21 and the back frame 22 can fix and cover the non-flat display panel 10 together. The front frame 21 reveals a display area 12 of the non-flat display panel 10.

Please further refer to FIG. 3. At least one support structure 30 is fixed to the outer surface of the back frame 22. The support structure 30 is employed to strengthen the intensity of the outer frame 20. Accordingly, the intensity and the curved feature of the non-flat panel display module 10 can be ensured.

Figure 4:
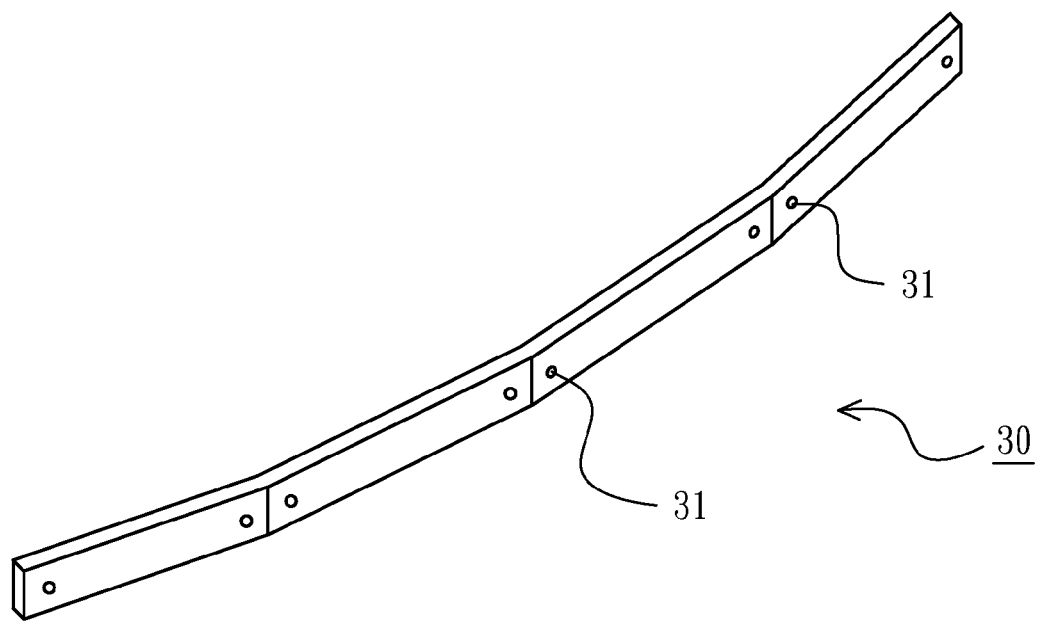
FIG. 4 shows a three dimensional view diagram of the support structure according to the first embodiment of the present invention.

As considering more in detail, please further refer to FIG. 3 and FIG. 4. FIG. 4 shows a three dimensional view diagram of the support structure according to the first embodiment of the present invention. As shown in Figures, the support structure 30 has a thickness. The support structure 30 can be formed in solid or hollow. The support structure 30 is preferably a rigid material support structure which can be manufactured by metal material or non-metal material. Besides, the support structure 30 is preferably founded or stamped but not limited thereto. As shown in FIG. 3 and FIG. 4, the support structure 30 is preferably little shorter than the non-flat display panel 10. The inner surface of the support structure 30 is formed to be in accordance with the non-flat shape of the outer surface of the back frame 22, i.e. to be curved in accordance with the outer surface of the back frame 22.

Besides, the support structure 30 comprises a plurality of fixing holes 31 and fixed to a plurality of screw holes (not shown) correspondingly positioned on the outer surface of the back frame 22 by a plurality of screwed elements (not shown). Moreover, the amount of the support structures as shown in FIG. 3 can be two or more and parallelly aligned one with another.

In conclusion, the support structure 30 is manufactured with rigid material and has a thickness effectively to strengthen the intensity of the back frame 22 of the outer frame 20 and accordingly, to ensure the intensity and the curved feature of the non-flat panel display module 10.

Figure 5:
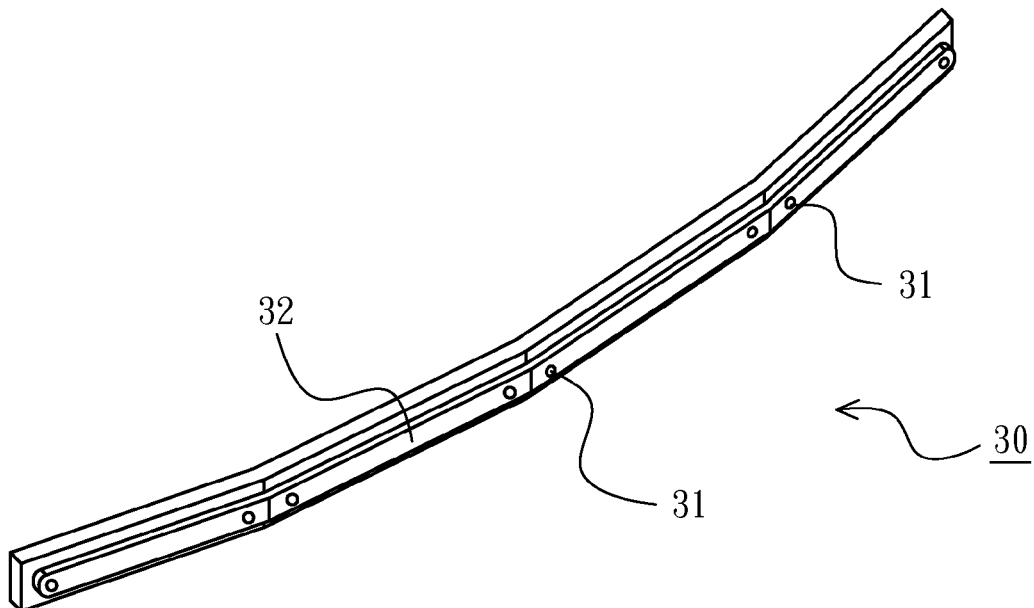
FIG. 5 shows a three dimensional view diagram of the support structure according to the second embodiment of the present invention.

Please refer to FIG. 5, which shows a three dimensional view diagram of the support structure according to the second embodiment of the present invention. In the second embodiment, the support structure 30 is similar to the support structure 30 in the first embodiment and therefore, the same indicators and names are followed. The difference is: the support structure 30 further comprises at least one reinforcing rib 32 set on an outer surface thereof. The reinforcing rib 32 is set along the thickness direction of the support structure 30 to strengthen the intensity of the support structure 30 in advance. Meanwhile, the intensity of the outer frame 20 can be further strengthened. Accordingly, the intensity and the curved feature of the non-flat panel display module 10 can be double ensured.

Figure 6:
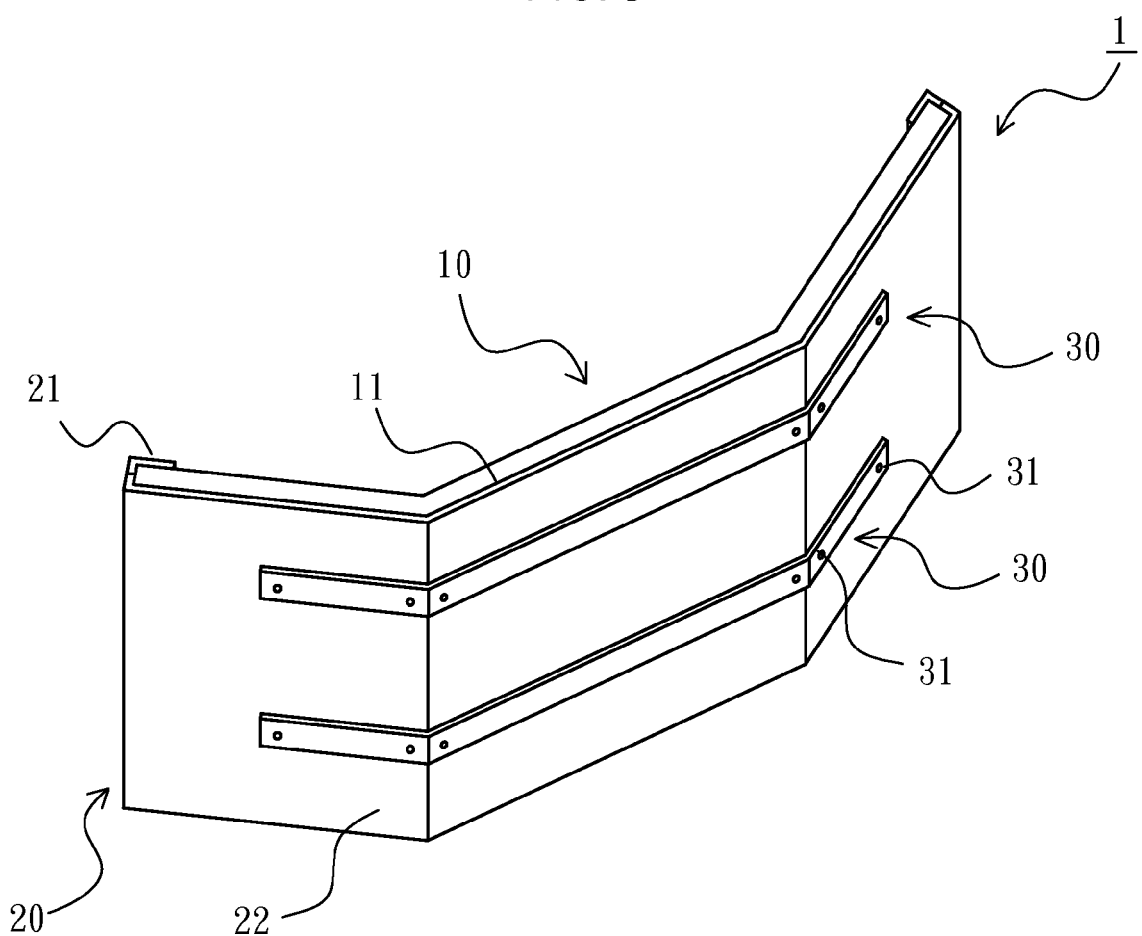
FIG. 6 shows a three dimensional view assembly diagram of the support structure according to the third embodiment of the present invention.

Please refer to FIG. 6, which shows a three dimensional view assembly diagram of the support structure according to the third embodiment of the present invention. In the third embodiment, the non-flat panel display module 1 is still similar to the non-flat panel display module 1 in the first embodiment and therefore, the same indicators and names remain followed. The difference is: the non-flat panel display module 1 is a multiple sections display panel, which the non-flat panel display module 10 is composed by several flat surfaces (not parallel) with contained angles therebetween. The non-flat display panel 10 is composed by several flat display panel units (three sections in figure) connected with one by one. The panels at two sides are set forward to create a concave like effect. Therefore, similar to the support structure 30 in the first embodiment, at least one support structure 30 is fixed to the outer surface of the back frame 22 to strengthen the intensity of the outer frame 20. Accordingly, the intensity and the curved feature of the non-flat panel display module 10 can be ensured.

In conclusion, comparing with the back frame of the non-flat panel display module of prior art with less intensity, easily deformable or with a recovery tension, which cannot ensure the curved feature of the non-flat panel display module to result a quality defect, the back frame 22 of the non-flat panel display module 10 of the present invention with at least one support structure 30 fixed to the outer surface thereof to strengthen the intensity of the outer frame 20. Accordingly, the intensity and the curved feature of the non-flat panel display module 10 can be ensured.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A non-flat panel display module, comprising:

A non-flat display panel having a non-flat shaped back surface; and

An outer frame, comprising a single back frame, in accordance with the non-flat shaped back surface of the non-flat display panel, the single back frame fixed to the non-flat back surface of the non-flat display panel, the single back frame of the outer frame having a non-flat shaped outer surface;

At least one support structure having:

An inner surface formed to be curved in accordance with the non-flat shaped outer surface of the single back frame, each inner surface of each of the at least one support structure being fixed to the non-flat shaped outer surface of the single back frame; and An outer surface, the outer surface opposite the inner surface, wherein each of the at least one support structure is horizontally fixed to the non-flat shaped outer surface of the single back frame, wherein a length of each of the at least one support structure is shorter than a length of the non-flat display panel; and At least one reinforcing rib being set along the outer surface of each of the at least one support structure, each of the at least one reinforcing rib being without connection with the non-flat shaped outer surface of the single back frame, wherein the at least one support structure and the at least one reinforcing rib are positioned non-movably with respect to the non-flat shaped outer surface of the single back frame.

2. The non-flat panel display module of claim 1, wherein the non-flat display panel is a curved display panel or a multiple sections bended display panel.

3. The non-flat panel display module of claim 1, wherein the outer frame further comprises a front frame, the front frame and the single back frame fix and cover the non-flat display panel together, and the front frame reveals a display area of the non-flat display panel.

4. The non-flat panel display module of claim 1, wherein the at least one support structure further comprises a plurality of fixing holes to be fixed to a plurality of screw holes correspondingly positioned on the non-flat shaped outer surface of the single back frame by a plurality of screwed elements.

5. The non-flat panel display module of claim 1, wherein the amount of the at least one support structure is two or more, which are parallely aligned one with another.

6. A back frame support structure of a non-flat panel display module, comprising:

an inner surface formed to be curved in accordance with a non-flat shaped outer surface of a single back frame of the non-flat panel display module, each inner surface of each of the at least one support structure being fixed to the non-flat shaped outer surface of the single back frame; and an outer surface opposite the inner surface, wherein each of the at least one support structure is horizontally fixed to the non-flat shaped outer surface of the single back frame, wherein a length of each of the at least one support structure is shorter than a length of a non-flat display panel of the non-flat panel display module; and at least one reinforcing rib set along the outer surface of each of the at least one support structure, each of the at least one reinforcing rib being without connection with the non-flat shaped outer surface of the single back frame, wherein the at least one support structure and the at least one reinforcing rib are positioned non-movably with respect to the non-flat shaped outer surface of the single back frame.

7. The back frame support structure of the non-flat panel display module of claim 6, wherein the at least one support structure further comprises a plurality of fixing holes to be fixed to a plurality of screw holes correspondingly positioned on the non-flat shaped outer surface of the single back frame by a plurality of screwed elements.

8. The back frame support structure of the non-flat panel display module of claim 6, wherein the at least one support structure has a thickness and is solid or hollow.

9. The back frame support structure of the non-flat panel display module of claim 6, wherein the at least one support structure is a rigid material support structure.

\* \* \* \* \*